Figure 1:
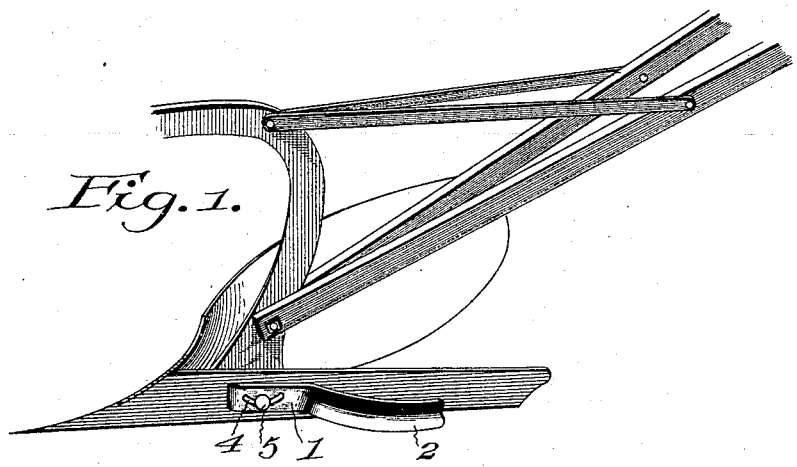

(No Model.)

T. F. DOVE.
COTTON AND CORN SCRAPER.

No. 604,207. Patented May 17, 1898.

Witnesses
N. Roy Appleman
V. B. Hillyard

Inventor
Thomas F. Dove.
By his Attorneys,
C. A. Snow & Co.

UNITED STATES PATENT OFFICE.

THOMS F. DOVE, OF COTTON GIN, TEXAS, ASSIGNOR OF ONE-THIRD TO W. R. ROLAND, OF SAME PLACE.

COTTON AND CORN SCRAPER.

SPECIFICATION forming part of Letters Patent No. 604,207, dated May 17, 1898.

Application filed November 20, 1897. Serial No. 659,256. (No model.)

*To all whom it may concern:*

Be it known that I, THOMS F. DOVE, a citizen of the United States, residing at Cotton Gin, in the county of Freestone and State of Texas, have invented a new and useful Cotton and Corn Scraper, of which the following is a specification.

The subject-matter of this invention is a scraper attachment for a turning-plow for barring off and sweeping up corn, cotton, sorghum, and like plants requiring tilling and cultivating.

The attachment comprises a shank and a blade, the latter projecting from the plane of the shank at an obtuse angle and in an upward direction and having a partial twist given thereto, whereby the cutting edge is thrown forward and the shank having a curved slot to admit of the attachment being properly adjusted and having its front end beveled, so as to preclude the formation of a shoulder, which would materially impede the progress of the plow and add to the draft.

In order that the invention may be fully comprehended, reference is to be had to the following description and the drawings hereto attached, in which corresponding and like parts are referred to and indicated by the same reference characters, and in the drawings—

Figure 2:
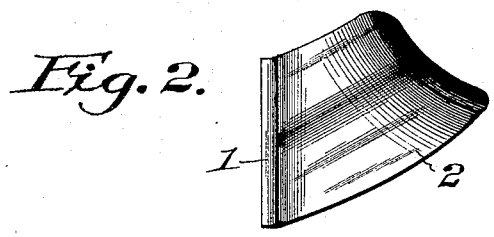
Figure 3:
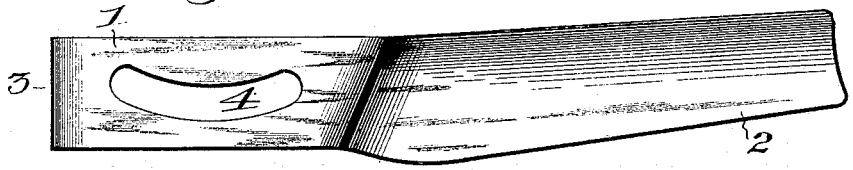
Figure 4:
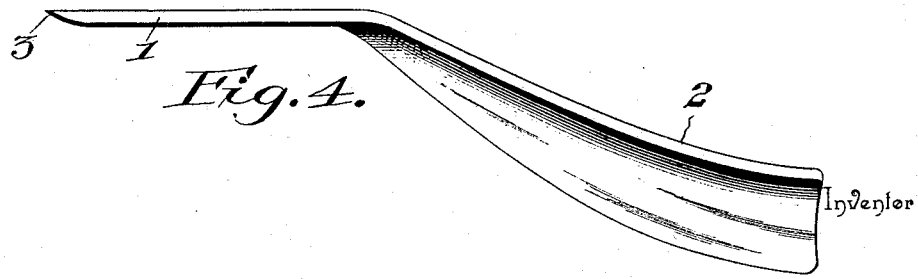

Figure 1 is a perspective view of a cultivating or turning plow of ordinary construction, having the attachment in position. Fig. 2 is a front view of the scraper. Fig. 3 is an elevation thereof. Fig. 4 is a top plan view.

The scraper is designed with a view to be used in connection with a cultivating or turning plow of any variety and is constructed of a strip or bar of steel or other suitable material which is bent between its ends to provide a shank 1 and a blade 2, the latter being sharpened at its lower edge and inclining outwardly and rearwardly from the plane of the shank and being deflected upwardly toward its outer end at a slight inclination. The blade is given a partial twist, whereby its cutting edge is thrown forward, so as to penetrate the soil and cause the latter to slide upwardly and rearwardly over the blade, thereby loosening and lightening the earth, while at the same time throwing it toward the plants to be hilled. The shank has its front end beveled, as shown at 3, thereby obviating the formation of a shoulder or abrupt projection along the length of the landside, which would be objectionable, since it would add materially to the draft of the plow and retard the progress thereof. A curved slot 4 is formed in the shank to receive the fastening-bolt 5, by means of which the attachment is secured to the landside of a cultivating or turning plow. By having the slot 4 curved and extending lengthwise of the shank the attachment can be adjusted to any required position to cause the blade to run deep or shallow, as desired.

The scraper is intended to be secured, as intimated, to the landside of a plow, and the blade projects therefrom at an outward and rearward inclination and in the operation of the plow throws the earth toward the roots of the plants to be barred or hilled, the elevation of the outer end of the blade depending upon the relative connection of the shank with the landside, which can be controlled by loosening the fastening-bolt 5, and after the blade is moved to the required position retightening the same.

Having thus described the invention, what is claimed as new is—

An improved article of manufacture, a scraper or sweep for plows constructed of a strip of metal bent between its ends upon an oblique line and at an obtuse angle, forming a shank and a blade, the latter inclining upwardly, rearwardly and outwardly from the plane of the shank and having a partial twist given thereto, and the shank having a centrally-disposed longitudinal slot curving in the direction of its length and having the front end of the shank beveled, substantially as and for the purpose described.

In testimony that I claim the foregoing as my own I have hereto affixed my signature in the presence of two witnesses.

THOMS F. DOVE.

Witnesses:
W. T. BONNERS,
L. HARRISS.